UNITED STATES PATENT OFFICE.

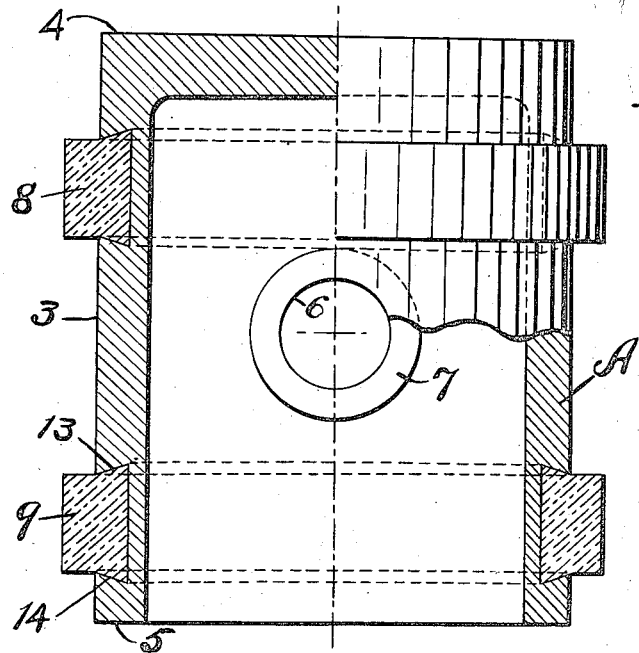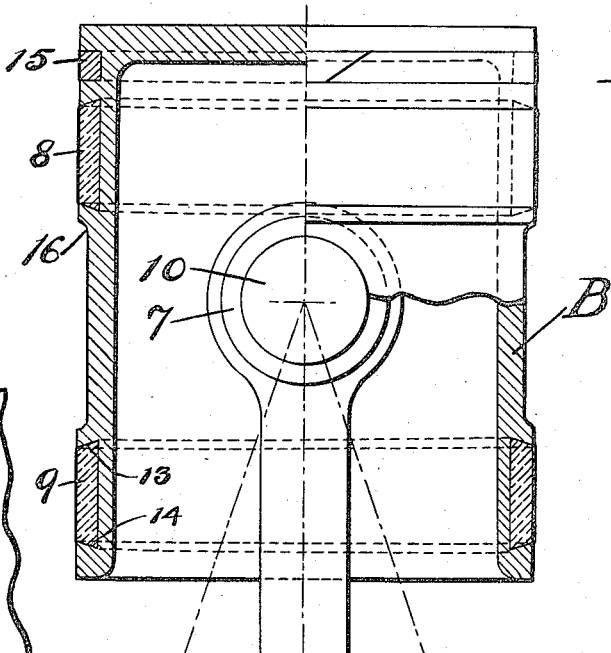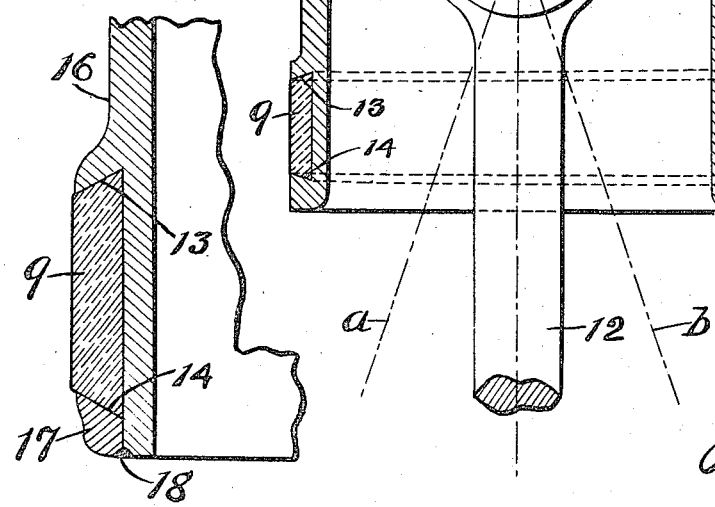

JOHN THOMSON, OF BROOKLYN, NEW YORK.

ENGINE PISTON.

1,426,022.   Specification of Letters Patent.   Patented Aug. 15, 1922.

Application filed May 10, 1921. Serial No. 468,210.

*To all whom it may concern:*

Be it known that I, JOHN THOMSON, a citizen of the United States, and a resident of the borough of Brooklyn, city and State of New York, have invented an Improvement in Engine Pistons, of which the following is a specification.

This invention consists of an improvement in engine-pistons for gas or steam engines, of the reciprocating type. The objects thereof are to effect an enduring tight seal against the actuating pressure of gas or steam; and to largely, or even wholly, avoid the use of oil as a lubricant.

The essence of this improvement may be thus briefly summated: The attachment to a metallic piston, of monolithic graphitized carbon rings applied in such manner, and under such operative conditions, that the said rings, when cool, will traverse the engine-cylinder comparatively free; but, when heated by the gas or steam, the said rings will be expanded to a close physical contact with the cylinder-wall, effecting a tight jointing and also serving as a lubricant.

In the drawings, which constitute a part of this invention,

Figure 1 is a vertical, center section, except as to a portion depicted in elevation, of a piston-casting provided with two graphite rings in place, ready for machining;

Figure 2 is a vertical, center section, except as to a portion depicted in elevation, of the finished piston, ready for insertion in its cylinder, the usual connecting rod or pitman being shown in its assembled position; and Figure 3 is a detached, enlarged sectional detail, denoting a modification in the mode of construction.

Figure 1 is an illustration of the piston, A, as it would ordinarily be cast, having finished allowances on its side, 3, enclosed top, 4, and lower edge, 5, with a cored hole, 6, passing through inner bosses, as 7. It also is here shown with two rings, 8, 9, formed of monolithic graphite, whose outer diameters are substantially greater than that of the metallic piston. In so far as the casting is concerned, the rings may be regarded as if they were baked sand-cores, whose aforesaid outer diameters rest in core-printed cavities of a green-sand mold, thereby supporting and holding them in their proper relative position.

The finished piston, B, is depicted in Figure 2, that is as machined along its side, top and edge; the cored hole of Figure 1 having been bored to take a pin, 10, upon which a connecting rod or pitman, 12, is mounted, as in the instance of an automobile gas-engine.

The preferred mode of forming the aforesaid rings is to machine them from tubes of graphitized carbon, such as is produced by the electric process of Acheson.

It is here to be particularly observed that the inner diameters of the rings are less than the inner diameter of the piston; and that portions of their sides, top and bottom, are preferably formed to angles, as 13, 14, each angle projecting outwardly and inclining towards the other, whereby a transverse, wedge-like section results.

When the rings are set in the mold, and the mold-cavity is filled with molten metal it wholly surrounds the wedge-section portion of the rings; hence, upon solidification and shrinkage of the metal, they are strongly gripped and held with the utmost uniformity and intimacy of physical contact.

When machining the cylindrical surface of the casting, the protruding perimeters of the rings are first removed, thereby leaving the wedge-portions in place, as Figure 2; and, at the final cut, the outer diameters thereof are finished some thousandths of an inch greater than that of the contiguous circumferential metal.

As the mass of metal in the piston, and its exposed area to hot gases, are much less than those of the containing cylinder, which dissipates heat to atmosphere, the piston itself is maintained at a higher temperature than that of the cylinder. Hence, even if the metal in each member is the same, and their respective co-efficients of expansion are alike, the diametral extension of the piston, because of its higher temperature, will be greater than that imparted to the wall of the cylinder. This condition is taken due cognizance of in practice, as evidenced by the fact that the outer diameters of gas-engine pistons are usually formed several thousandths of an inch less than that of the cylinders; but, even then, if there is any cessation in the lubrication, pernicious "freezing" is liable to, and frequently does, occur; on the other hand, if an excessive piston-clearance is provided, it will "side-slap," resulting in an objectionably noisy operation.

Although merely an academic statement, it may be here mentioned that amorphous carbon can readily be electrically graphitized to a state of nearly perfect purity and that, as a lubricant, it stands second only to oil; but it is not generally known that monolithic graphitized carbon is considerably compressible and is also highly resilient.

As a means of lubrication, the functioning of the said rings is as follows: Molecular-like particles are first-off ruptured from the contacting surface of graphite and transferred into the microscopic pores and "hollows" of the co-ordinating metal; whereby, once a balance is established, graphite-slides-on-graphite.

The preferred assembling maneuver is as follows: Insert the piston with its graphite rings turned to such a diameter that they will fit the cylinder fairly snugly. Revolve the crank-shaft of the engine to sufficiently reciprocate the piston so that the rings will effect a slight initial clearance. Then operate normally, as by gas or steam. In the latter instance, the rings, due to the before mentioned relative increase of their diameters, caused by thermic expansion, will again be pressed into tight contact with the cylinder-wall, previously coated with a film of transferred graphite, and eventually a further clearance will be effected corresponding to the normal maximum temperature; but this secondary clearance, or rather the intensity of physical contact, and the maintenance thereof between the co-ordinating surfaces, is largely a function of the inherent compressibility and resiliency of the graphite.

If the engine is actuated by an exploded mixture of gas and air, the combustion not being complete and the developed temperature of the reaction being sufficiently high, the upper graphite ring would slowly oxidize, or "air-burn." In such instance, or for any other desirable reason, an ordinary split metallic packing ring, as 15, Figure 2, may be employed; but, for this ring, the graphite film imparted to the cylinder-wall will serve as a lubricant.

The swing of the connecting rod, or pitman, as see center lines, $a$ $b$, imparts corresponding alternate side-thrusts to the piston; which, in ordinary practice, necessarily tends to a more rapid wear of the thrust resisting surfaces, eventually producing a piston and cylinder whose contour is ovoidal. This effect is largely diminished by the graphite rings.

The recess, 16, is to denote that the piston can thus be considerably lightened, as this portion thereof does not serve as a bearing surface.

While it is regarded preferable, particularly as to cost of production, that the graphite rings be embedded by casting molten metal thereon, this system is not necessarily restricted to that mode of attachment; for, as is depicted in the detached enlarged sectional detail, Figure 3, both the piston and the rings may be so machined that the latter can be slid to place, securing them, say, by ring-pieces, 17, which may thereafter be riveted, soldered, or electrically fused, as at 18. In certain circumstances, this mode of construction would possess the advantage of being able, from time to time, to renew the graphite rings.

Nor is it essential, in the realization of the advantages hereof, to uniformly adhere to the wedge-shaped section of the graphite rings; thus, for example, it would suffice to form a groove, or grooves, wherein the fluid metal would flow, effecting a tight grip and a close joint against a round-about escape of gas or steam. In other words, the detail may be as one may prefer to have it, whereby to effect a rigid mounting, or embedment, of the rings within metallic circumferential recesses.

What I claim is:

1. The combination, with an engine-cylinder and a reciprocating piston therein, of monolithic graphite bearing and jointing rings rigidly mounted in recesses on the exterior circumferential portion of the piston.

2. The combination, with an engine-cylinder and a reciprocating piston therein, of monolithic graphite bearing and jointing rings mounted in recesses on the exterior circumferential portion of the piston, the said rings being thus mounted by casting molten metal thereon.

3. The combination, with an engine-cylinder and a reciprocating piston therein, of monolithic graphite bearing and jointing rings rigidly mounted in recesses on the exterior circumferential portion of a metallic piston, the peripheral surfaces of the rings being formed to greater diameters than that of the piston.

4. A reciprocating piston for engine-cylinders comprised in a combination of metal with monolithic graphite relatively so disposed and formed that the graphite element serves both as the guide-bearing and the jointing member.

5. A reciprocating piston for engine-cylinders comprised in the combination of a metallic cylinder with monolithic graphite rings so formed, disposed and assembled that these rings serve both as the guide-bearings and the jointing members of said piston; and whose intensity or physical contact with the wall of the co-ordinating cylinder is a function of temperature derived from the impelling gas or steam.

6. A reciprocating piston for engine-cylinders provided with embedded monolithic graphite bearing and jointing rings and a supplemental split metal ring, the latter being located near the head or pressure-end of the piston, as and for the purpose herein specified.

This specification signed this 7th day of May A. D. 1921.

JOHN THOMSON.